United States Patent
Kono

(10) Patent No.: US 11,383,556 B2
(45) Date of Patent: Jul. 12, 2022

(54) TWO-WHEELED VEHICLE TYRE

(71) Applicant: Sumitomo Rubber Industries, Ltd., Hyogo (JP)

(72) Inventor: Kyosuke Kono, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 650 days.

(21) Appl. No.: 16/257,388

(22) Filed: Jan. 25, 2019

(65) Prior Publication Data
US 2019/0263183 A1    Aug. 29, 2019

(30) Foreign Application Priority Data

Feb. 27, 2018  (JP) .............................. JP2018-033467

(51) Int. Cl.
*B60C 9/22*     (2006.01)
*B60C 11/00*    (2006.01)
(Continued)

(52) U.S. Cl.
CPC ........ *B60C 11/0008* (2013.01); *B60C 11/005* (2013.01); *B60C 11/033* (2013.01); *B60C 9/2006* (2013.01); *B60C 9/22* (2013.01); *B60C 11/032* (2013.01); *B60C 11/0304* (2013.01); *B60C 11/0327* (2013.01); *B60C 2009/2214* (2013.01); *B60C 2011/0025* (2013.01); *B60C 2011/0033* (2013.01); *B60C 2200/10* (2013.01)

(58) Field of Classification Search
CPC ... B60C 11/008; B60C 11/005; B60C 11/033; B60C 2011/0025; B60C 2200/10; B60C 11/0327
See application file for complete search history.

(56) References Cited

U.S. PATENT DOCUMENTS

| 2012/0018067 | A1* | 1/2012 | Hikita ..................... | B60C 11/11 |
| | | | | 152/209.8 |
| 2015/0122383 | A1* | 5/2015 | Hikita ................. | B60C 11/1369 |
| | | | | 152/209.11 |
| 2018/0086145 | A1* | 3/2018 | Dairiki ................ | B60C 11/0302 |

FOREIGN PATENT DOCUMENTS

| EP | 1 004 460 A2 | 5/2000 |
| EP | 2 610 076 A1 | 7/2013 |

(Continued)

OTHER PUBLICATIONS

The extended European search report issued by the European Patent Office dated Jul. 22, 2019, which corresponds to European Patent Application No. 19152942.9-1012 and is related to U.S. Appl. No. 16/257,388.

*Primary Examiner* — Alison L Hindenlang
*Assistant Examiner* — Debjani Roy
(74) *Attorney, Agent, or Firm* — Studebaker & Brackett PC

(57) ABSTRACT

A two-wheeled vehicle tyre includes a tread portion including a tread rubber. The tread rubber includes a cap rubber forming a tread surface and a base rubber disposed radially inwardly of the cap rubber. 300% modulus (M300c) of the cap rubber is greater than 300% modulus (M300b) of the base rubber. Loss tangent (tan δc) of the cap rubber is smaller than loss tangent (tan δb) of the base rubber. The tread surface includes a crown region centered on a tyre equator and a pair of shoulder regions located axially outwardly of the crown region, and a thickness of the cap rubber in the crown region is greater than a thickness of the cap rubber in each of the shoulder regions.

15 Claims, 2 Drawing Sheets

(51) Int. Cl.
*B60C 11/03* (2006.01)
*B60C 9/20* (2006.01)

(56) References Cited

FOREIGN PATENT DOCUMENTS

| JP | H05201207 | * | 8/1993 |
| JP | 2002-059709 A | | 2/2002 |
| JP | 2002059709 | * | 2/2002 |
| JP | 2008-222155 A | | 9/2008 |
| JP | 2008222155 | * | 9/2008 |
| JP | 2014-156209 A | | 8/2014 |
| JP | 2014156209 | * | 8/2014 |

* cited by examiner

TWO-WHEELED VEHICLE TYRE

BACKGROUND ART

The present disclosure relates to a two-wheeled vehicle tyre capable of improving steering stability, durability and wear resistance in a well-balanced manner.

DESCRIPTION OF THE RELATED ART

Due to increasing in size as well as speeding up of motorcycles, two-wheeled vehicle tyres have also been required to have high-speed durability and wear resistance in addition to steering stability which had been considered to be important so far. For example, the following Patent Document 1 discloses a motorcycle tyre having a tread rubber which includes a cap rubber layer and a base rubber layer. The cap rubber layer is made of a rubber composition superior to wear resistance. Further, in order to improve both durability and wear resistance, loss tangent of the cap rubber layer as well as the base rubber layer has been improved.

PATENT DOCUMENT

[Patent Document 1]
Japanese Unexamined Patent Application Publication 2008-222155

SUMMARY OF THE DISCLOSURE

Although rubber having a large loss tangent (tan $\delta$) can be superior to impact absorbing property, the rubber tends to generate much heat which is a factor that deteriorates durability and wear resistance of the two-wheeled vehicle tyre. Thus, there has been a problem that the two-wheeled vehicle tyre disclosed in Patent document 1 exhibits poor durability and wear resistance because the cap rubber which comes into contact with the ground employs rubber having a large loss tangent (tan $\delta$).

In view of the above circumstances in the conventional art, the present disclosure has a major object to provide a two-wheeled vehicle tyre capable of improving steering stability, durability and wear resistance in a well-balanced manner.

According to one aspect of the disclosure, a two-wheeled vehicle tyre includes a tread portion including a tread rubber. The tread rubber includes a cap rubber forming a tread surface and a base rubber disposed radially inwardly of the cap rubber. 300% modulus (M300c) of the cap rubber is greater than 300% modulus (M300b) of the base rubber, and loss tangent (tan $\delta c$) of the cap rubber is smaller than loss tangent (tan $\delta b$) of the base rubber. The tread surface includes a crown region centered on a tyre equator and a pair of shoulder regions located axially outwardly of the crown region, and a thickness of the cap rubber in the crown region is greater than a thickness of the cap rubber in each of the shoulder regions.

In another aspect of the disclosure, the cap rubber may vary smoothly in thickness from the crown region to each of the shoulder regions.

In another aspect of the disclosure, in the crown region, a thickness of the cap rubber may be in a range of from 40% to 90% of a thickness of the tread rubber.

In another aspect of the disclosure, in each of the shoulder regions, a thickness of the cap rubber may be in a range of from 10% to 30% of a thickness of the tread rubber.

In another aspect of the disclosure, a land ratio of the tread surface in the crown region may be smaller than a land ratio of the tread surface in each of the shoulder regions.

In another aspect of the disclosure, a land ratio of the tread surface in the crown region may be in a range of from 88% to 92%.

In another aspect of the disclosure, a land ratio of the tread surface in each of the shoulder regions may be equal to or more than 95%.

In another aspect of the disclosure, the crown region may have a width ranging from 30% to 40% of a tread width.

In another aspect of the disclosure, the 300% modulus (M300c) of the cap rubber may be in a range of from 1.1 to 1.8 times the 300% modulus (M300b) of the base rubber.

In another aspect of the disclosure, the loss tangent (tan $\delta c$) of the cap rubber may be in a range of from 0.6 to 0.9 times the loss tangent (tan $\delta b$) of the base rubber.

DESCRIPTION OF THE PREFERRED EMBODIMENTS

An embodiment of the present disclosure will be explained below with reference to the accompanying drawings.

Figure 1:
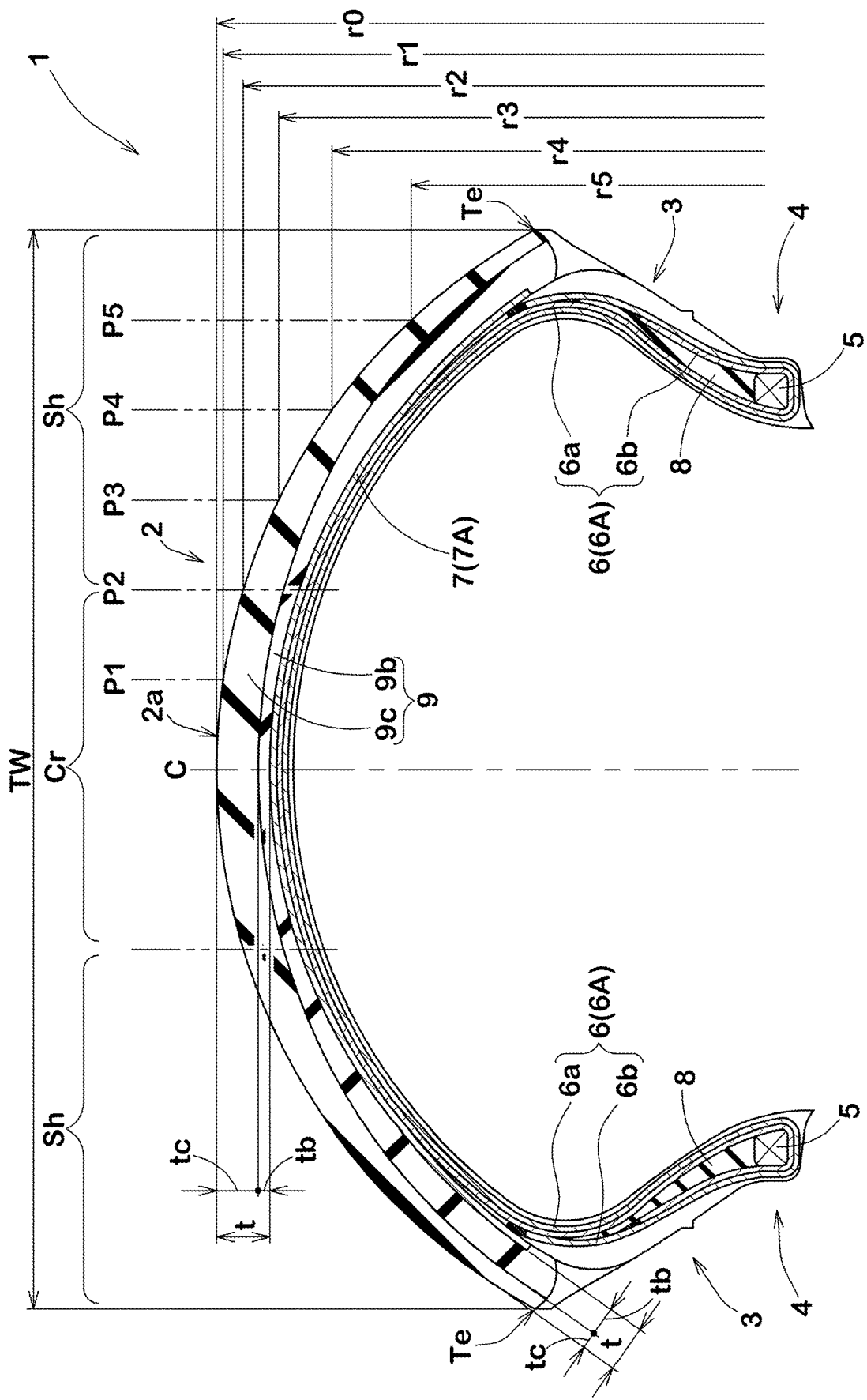
FIG. 1 is a cross-sectional view of a two-wheeled vehicle tyre in accordance with an embodiment of the disclosure.

FIG. 1 illustrates a cross-sectional view of a two-wheeled vehicle tyre hereinafter, simply referred to as "tyre") 1 in accordance with an embodiment, wherein the tyre is placed under a standard condition.

The tyre 1, for example, is suitable for use of motorcycles (not illustrated).

As used herein, the standard condition is such that the tyre 1 is mounted on a standard wheel rim R and inflated to a standard pressure but loaded with no tyre load.

In this application including specification and claims, various dimensions, positions and the like of the tyre 1 refer to those under the standard condition of the tyre 1 unless otherwise noted.

As used herein, the standard wheel rim is a wheel rim officially approved or recommended for the tyre 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tyre by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tyre 1 according to the embodiment includes a carcass 6 extending between bead cores 5 each disposed in a respective one of bead portions 4 through a tread portion 2 and sidewall portions 3, and a belt layer 7 disposed radially outwardly of the carcass 6 in the tread portion 2.

The carcass 6 includes at least one, preferably two carcass plies 6A as this embodiment. Preferably, the carcass 6 is configured as a radial structure. Alternately, the carcass 6 may be configured as a bias structure.

The carcass plies 6A include carcass cords which are preferably oriented at an angle of from 65 to 90 degrees with respect to the tyre equator C. As the carcass cords, an organic fiber cord. e.g., nylon, rayon, polyester and aromatic polyamide may preferably be employed, for example.

At least one of the carcass plies 6A has a main portion 6a extending between the bead cores 5 through the tread portion 2 and the sidewall portions 3 and a pair of turn-up portions 6b each turned up around a respective one of the bead cores 5. In this embodiment, each of two carcass plies 6A includes the main portion 6a and the pair of turn-up portion 6b.

In each bead portion 4, it is preferable that the bead apex rubber 8 is disposed between the main portion 6a and the turn-up portion 6b. The bead apex rubber 8 is made of a hard rubber composition, thus enhancing the bead portion 4 effectively.

The belt layer 7 according to the embodiment is configured to have at least one belt ply 7A. Preferably, the belt ply 7A of the belt layer 7 includes steel cords oriented along the tyre circumferential direction. Here, the language "oriented along the tyre circumferential direction" means that the steel cords have angles within 5 degrees with respect to the tyre circumferential direction. Such a belt layer 7 can reduce tread deformation upon traveling, improving durability of the tyre 1.

The tread portion 2 according to the embodiment includes a tread rubber 9 disposed radially outwardly of the belt layer 7. In this embodiment, the tread rubber 9 includes a cap rubber 9c forming a tread surface 2a and a base rubber 9b disposed radially inwardly of the cap rubber 9c. Preferably, the base rubber 9b is arranged adjacently to the belt layer 7.

Preferably, 300% modulus (M300c) of the cap rubber 9c is greater than 300% modulus (M300b) of the base rubber 9b. Such a cap rubber 9c has high rigidity since the 300% modulus (M300c) is high, improving wear resistance of the tyre 1.

As used herein, 300% modulus (M300) means a value of modulus in elongation at 300% at 30 degrees C. measured based on JIS K6251 "Rubber, vulcanized or thermoplastic—Determination of tensile stress-strain properties".

Preferably, loss tangent (tan δc) of the cap rubber 9c is smaller than loss tangent (tan δb) of the base rubber 9b. Such a cap rubber 9c generates less heat since the loss tangent (tan δc) is small, improving durability of the tyre 1. On the other hand, since the base rubber 9b has a relatively large loss tangent (tan δb), it can exhibit high impact absorbing property, improving steering stability of the tyre 1.

As used herein, loss tangent (tan δ) means a value of loss tangent measured using a visco-elastic spectrometer under the following conditions based on JIS K6394 "Rubber, vulcanized or thermoplastic—Determination of dynamic properties—General guidance":

initial strain 10%;
amplitude plus/minus 2%;
frequency 10 Hz:
tensile deformation mode; and
temperature 70 degrees C.

As used herein, steering stability of tyre means a concept that includes various properties, e.g., grip performance upon cornering, cornering stability, ride comfort upon straight traveling, and transient characteristic changing from straight traveling to cornering.

Preferably, the 300% modulus (M300c) of the cap rubber 9c is in a range of from 1.1 to 1.8 times the 300% modulus (M300b) of the base rubber 9b. When the 300% modulus (M300c) of the cap rubber 9c is less than 1.1 times the 300% modulus (M300b) of the base rubber 9b, wear resistance of the tyre 1 may not be improved. When the 300% modulus (M300c) of the cap rubber 9c is greater than 1.8 times the 300% modulus (M300b) of the base rubber 9b, a separation at a rubber boundary between the cap rubber 9c and the base rubber 9b may occur due to the difference in the physical properties thereof, thus there is a possibility that durability of the tyre 1 cannot be improved.

In view of the above, the 300% modulus (M300c) of the cap rubber 9c is more preferably in a range of from 1.1 to 1.5 times the 300% modulus (M300b) of the base rubber 9b.

Preferably, the loss tangent (tan δc) of the cap rubber 9c is in a range of from 0.6 to 0.9 times the loss tangent (tan δb) of the base rubber 9b. When the loss tangent (tan δc) of the cap rubber 9c is less than 0.6 times the loss tangent (tan δb) of the base rubber 9b, a separation at a rubber boundary between the cap rubber 9c and the base rubber 9b may occur due to the difference in the physical properties thereof, and thus there is a possibility that durability of the tyre 1 cannot be improved. When the loss tangent (tan δc) of the cap rubber 9c is greater than 0.9 times the loss tangent (tan δb) of the base rubber 9b, impact absorbing property of the base rubber 9b may be restricted, thus there is a possibility that steering stability of the tyre 1 cannot be improved.

In view of the above, the loss tangent (tan δc) of the cap rubber 9c is more preferably in a range of from 0.7 to 0.9 times the loss tangent (tan δb) of the base rubber 9b.

Figure 2:
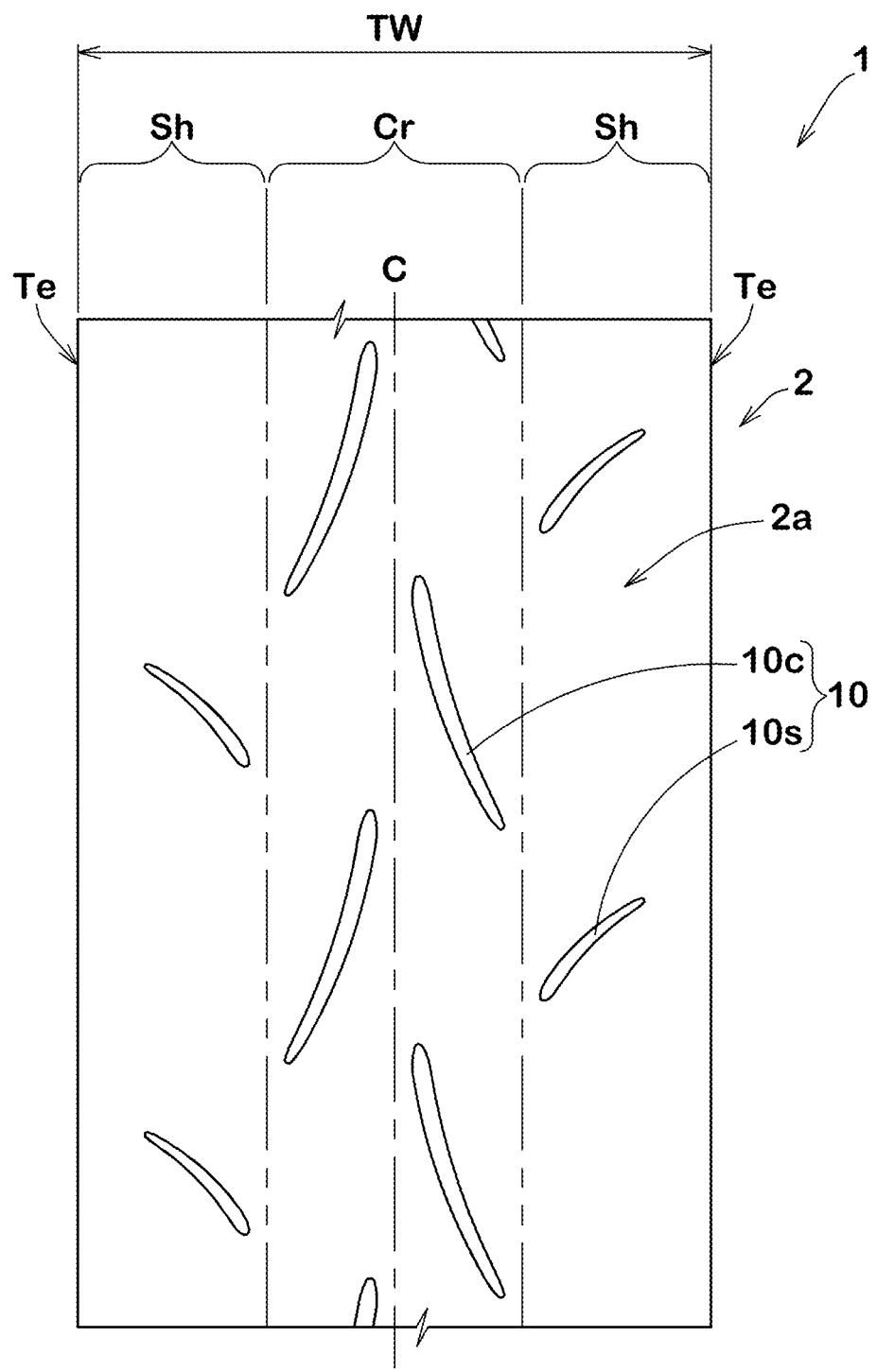
FIG. 2 is a development view of a tread portion of the tyre illustrated in FIG. 1.

FIG. 2 illustrates a development view of the tread portion 2 of the tyre shown in FIG. 1. As illustrated in FIG. 1 and FIG. 2, the tread surface 2a according to the embodiment includes a crown region Cr including the tyre equator C as a center thereof, and a pair of shoulder regions Sh located axially outwardly of the crown region Cr.

Here, the crown region Cr is a region that mainly comes into contact with the ground when not only straight traveling but also cornering with small camber angles. Further, the shoulder regions Sh are regions that mainly come into contact with the ground when cornering with large camber angles.

For example, the crown region Cr has a width ranging from 30% to 40% of the tread width TW. As used herein, the tread width TW is an axial distance between tread edges Te of the tread portion 2. As used herein, the tread edges Te are axially outermost edges of the tread surface 2a of the tread portion 2.

As illustrated in FIG. 1, it is preferable that a thickness tc of the cap rubber 9c in the crown region Cr is greater than a thickness tc of the cap rubber 9c in the shoulder regions Sh. Since such a cap rubber 9c having a relatively greater thickness tc in the crown region Cr, wear resistance upon straight traveling which occurs frequently can be improved.

Preferably, the thickness tc of the cap rubber 9c varies smoothly from the crown region Cr toward the shoulder regions Sh. Such a cap rubber 9c exhibits superior transient characteristic upon changing from straight traveling to cornering, improving steering stability of the tyre 1.

Preferably, a thickness tb of the base rubber 9b in the crown region Cr is smaller than a thickness tb of the base rubber 9b in the shoulder regions Sh. Since such a base rubber 9b has a relatively smaller thickness tb in the crown region Cr, it generates less heat, and thus durability upon straight traveling which occurs frequently can be improved. Further, since the base rubber 9b has a relatively greater thickness tb in the shoulder regions Sh, steering stability upon cornering can be improved.

Preferably, in the crown region Cr, the thickness tc of the cap rubber 9c is in a range of from 40% to 90% of the thickness t of the tread rubber 9. In the crown region Cr, when the thickness tc of the cap rubber 9c is less than 40% of the thickness t of the tread rubber 9, there is a risk that wear resistance upon straight traveling which occurs frequently is not improved. Also, in the crown region Cr, when the thickness tc of the cap rubber 9c is greater than 90% of the thickness t of the tread rubber 9, there is a risk that ride comfort upon straight traveling as well as steering stability are not improved.

In view of the above, the thickness tc of the cap rubber 9c in the crown region Cr is more preferably in a range of from 40% to 60% of the thickness t of the tread rubber 9 in the crown region Cr.

Here, the thickness t of the tread rubber 9 is equal to a sum of the thickness tc of the cap rubber 9c and the thickness tb of the base rubber 9b. In this embodiment, the thickness t of the tread rubber 9 in the crown region Cr is equal to a distance from the tread surface 2a to the belt layer 7 in the crown region Cr.

Preferably, in each of the shoulder regions Sh, the thickness tc of the cap rubber 9c is in a range of from 10% to 30% of the thickness t of the tread rubber 9. In each of the shoulder regions Sh, when the thickness tc of the cap rubber 9c is less than 10% of the thickness t of the tread rubber 9, there is a risk that wear resistance upon cornering is not improved. On the other hand, in each of the shoulder regions Sh, when the thickness tc of the cap rubber 9c is greater than 90% of the thickness t of the tread rubber 9, there is a risk that steering stability is not improved due to poor grip performance upon cornering.

In view of the above, in each of the shoulder regions Sh, the thickness tc of the cap rubber 9c is more preferably in a range of from 10% to 20% of the thickness t of the tread rubber 9.

As illustrated in FIG. 2, it is preferable that the tread portion 2 is provided with grooves 10. The grooves 10, for example, include crown grooves 10c arranged in the crown region Cr and shoulder grooves 10s arranged in the shoulder regions Sh. These grooves 10 are useful to drain water from under the tread portion 2, thus improving steering stability on wet road conditions.

In this embodiment, a land ratio of the tread surface 2a in the crown region Cr is smaller than a land ratio of the tread surface 2a in the shoulder regions Sh. As used herein, a land ratio of a region means a ratio St/S of the sum total St of the ground contact areas of the tread surface 2a in the concerned region to the gross contact area S of the tread surface 2a of the concerned region, wherein the gross contact area S is calculated by summing the sum total St and the sum total of groove areas of the tread portion 2 in the concerned region.

Preferably, the land ratio of the tread surface 2a in the crown region Cr is in a range of from 88% to 92%. When the land ratio of the tread surface 2a in the crown region Cr is less than 88%, the land ratio difference between the crown region Cr and the respective one of shoulder regions Sh becomes large, the improvement of the transient characteristic can be restricted, and thus there is a risk that steering stability is not improved. When the land ratio of the tread surface 2a in the crown region Cr is greater than 92%, steering stability may not improve due to poor ride comfort upon straight traveling.

Preferably, the land ratio of the tread surface 2a in the respective one of the shoulder regions Sh is equal to or more than 95%. When the land ratio of the tread surface 2a in the respective one of the shoulder regions Sh is less than 95%, the rigidity of the tread portion 2 upon cornering tends to be reduced, and there is a risk that steering stability is not improved.

As illustrated in FIG. 1, a maximum outer diameter r0 of the tread surface 2a placed under the standard condition (i.e., the tyre 1 is mounted on the standard wheel rim (not illustrated) and inflated to the standard pressure) is equal to or less than 100.4% of a maximum outer diameter of the tread surface 2a when the tyre 1 is mounted on the standard wheel rim and inflated to 10 kPa. Here, the maximum outer diameter r0 of the tread surface 2a is the outer diameter of the tread surface 2a at the tyre equator C.

When the maximum outer diameter r0 is greater than 100.4% of the maximum outer diameter under the inner pressure of 10 kPa, the rigidity of the tread portion 2 becomes low, and thus steering stability may not improve due to poor transient characteristic. On the other hand, when the maximum outer diameter r0 is less than the maximum outer diameter under the inner pressure of 10 kPa, the tread portion 2 has an excessively high rigidity, and thus steering stability may not improve due to poor ride comfort upon straight traveling. In view of the above, the maximum outer diameter r0 is more preferably in a range of from 100.10% to 100.3% of the maximum outer diameter under the inner pressure of 10 kPa.

Preferably, an outer diameter at an arbitrary location over the tread surface 2a of the tyre 1 when inflated to the standard pressure is equal to or less than 100.4% of an outer diameter of the arbitrary location of the tread surface 2a of the tyre 1 when inflated to 10 kPa. As to the arbitrary location, for example, is either one of the locations P1 to P5 which equally divide the half tread surface 2a from the tyre equator C to one of the tread edges Te into six regions in the tyre axial direction.

In this embodiment, at the location P1, the outer diameter r1 of the tread surface 2a when inflated to the standard pressure is equal to or less than 100.4% of the outer diameter thereof when inflated to 10 kPa. Similarly, at the respective one of the locations P2 to P5, each of the outer diameters r2 to r5 of the tread surface 2a when inflated to the standard pressure is equal to or less than 100.4% of a corresponding outer diameter of the tread surface 2a when inflated to 10 kPa.

At the tyre equator C as well as the locations P1 to P5, when either one of the outer diameters r0 to r5 is greater than 100.4% of the corresponding outer diameter when inflated to 10 kPa, it may be difficult to expect an improvement of the transient characteristic, and thus there is a risk that steering stability is not improved. On the other hand, when either one of the outer diameters r0 to r5 is smaller than the corresponding outer diameter when inflated to 10 kPa, it may be difficult to expect an improvement of ride comfort upon straight traveling, there is a risk that steering stability is not improved. In view of the above, the outer diameters r0 to r5 when inflated to the standard pressure are more preferably in a range of from 100.1% to 100.3% of the corresponding outer diameters thereof when inflated to 10 kPa.

While the particularly preferable embodiments in accordance with the present disclosure have been described in detail, the present disclosure is not limited to the illustrated embodiments, but can be modified and carried out in various aspects.

Example

Two-wheeled vehicle radial tyres having a basic structure shown in FIG. 1 as well as the tread pattern shown in FIG.

2 were prototyped based on the detail shown in Table 1. Then, steering stability, durability and wear resistance of each test tyres was tested. As to the steering stability and wear resistance, each test tyre was attached to a rear wheel of a motorcycle. As to the durability, a drum tester was used.

The common specification and the testing methods for the test tyres are as follows:
tyre size: 180/55ZR17;
rim size: MT5.50×17; and
inner pressure: 290 kPa.

Steering Stability Test:

A test rider drove the motorcycle (1300 cc) to which each test tyre was attached on a dry asphalt test course to evaluate grip performance upon cornering, cornering stability, ride comfort upon straight traveling, and transient characteristic changing from straight traveling to cornering by the driver's sense using a five-point scoring system. The test results are shown in Table 1 using an average point of four tests. The larger value indicates better the steering stability.

Durability Test:

Each test tyre was mounted to a drum tester and made to run under a vertical load of 1.75 kN while stepping up the traveling speed until the tyre was broken. Then, the traveling speed when the tyre was broken was measure based on ECE 75. The test results are shown in Table 1 using an index where the Ref. 1 is set to 100. The larger value indicates better the durability.

Wear Resistance Test:

A test rider drove the motorcycle to which each test tyre was attached on public roads for 15,000 km, and after traveling an amount of wear was measured. The test results are shown in Table 1 using an index where the remaining tread rubber thickness of Ref. 1 is set to 100. The larger value indicates better the wear resistance.

Table 1 shows the test results.

TABLE 1

|  | Ref. 1 | Ref. 2 | Ref. 3 | Ex. 1 | Ex. 2 | Ex. 3 |
|---|---|---|---|---|---|---|
| Cap rubber modulus M300c/ base rubber modulus M300b | 1.15 | 0.93 | 1.76 | 1.76 | 1.98 | 1.76 |
| Cap rubber loss tangent (tan δc)/ base rubber loss tangent (tan δb) | 0.77 | 1.13 | 0.63 | 0.63 | 0.59 | 0.63 |
| <Crown region> Cap rubber thickness tc/ tread rubber thickness t (%) | 50 | 80 | 50 | 80 | 80 | 80 |
| <Shoulder region> Cap rubber thickness tc/ tread rubber thickness t (%) | 50 | 15 | 50 | 15 | 15 | 15 |
| Land ratio of crown region (%) | 94 | 90 | 90 | 90 | 90 | 94 |
| Land ratio of each shoulder region (%) | 94 | 96 | 96 | 96 | 96 | 94 |
| Grip performance (score) | 3.00 | 3.75 | 4.00 | 3.75 | 4.00 | 3.75 |
| Cornering stability (score) | 3.00 | 3.00 | 2.75 | 3.50 | 3.25 | 3.50 |
| Cornering ride comfort (score) | 3.00 | 2.75 | 2.75 | 3.50 | 3.50 | 3.50 |
| Durability (index) | 100 | 90 | 120 | 120 | 115 | 115 |
| Wear resistance (index) | 100 | 90 | 110 | 110 | 115 | 110 |

From the test results, it is confirmed that the example tyres, as compared with the comparative examples, improve steering stability, durability and wear resistance in a well-balanced manner.

What is claimed is:

1. A two-wheeled vehicle tyre comprising:
a tread portion comprising a tread surface, a pair of tread edges that is axially outermost edges of the tread surface, and a tread rubber,
the tread rubber comprising a cap rubber forming the tread surface and a base rubber disposed radially inwardly of the cap rubber,
the cap rubber extending over an entire region between the pair of tread edges,
300% modulus (M300c) of the cap rubber being greater than 300% modulus (M300b) of the base rubber,
loss tangent (tan δc) of the cap rubber being smaller than loss tangent (tan δb) of the base rubber,
the tread surface comprising a crown region centered on a tyre equator and a pair of shoulder regions located axially outwardly of the crown region,
a thickness of the cap rubber in the crown region being greater than a thickness of the cap rubber in each of the shoulder regions,
in the crown region, a thickness of the cap rubber is in a range of from 80% to 90% of a thickness of the tread rubber,
the cap rubber decreases continuously in thickness from the crown region to each of the pair of tread edges, and
the base rubber increases continuously in thickness from the crown region to each of the pair of tread edges.

2. The two-wheeled vehicle tyre according to claim 1, wherein
the cap rubber varies smoothly in thickness from the crown region to each of the shoulder regions.

3. The two-wheeled vehicle tyre according to claim 1, wherein
in each of the shoulder regions, a thickness of the cap rubber is in a range of from 10% to 30% of a thickness of the tread rubber.

4. The two-wheeled vehicle tyre according to claim 1, wherein
a land ratio of the tread surface in the crown region is smaller than a land ratio of the tread surface in each of the shoulder regions.

5. The two-wheeled vehicle tyre according to claim 1, wherein
a land ratio of the tread surface in the crown region is in a range of from 88% to 92%.

6. The two-wheeled vehicle tyre according to claim 1, wherein
a land ratio of the tread surface in each of the shoulder regions is equal to or more than 95%.

7. The two-wheeled vehicle tyre according to claim 1, wherein
the crown region has a width ranging from 30% to 40% of a tread width.

8. The two-wheeled vehicle tyre according to claim 1, wherein the 300% modulus (M300c) of the cap rubber is in a range of from 1.1 to 1.8 times the 300% modulus (M300b) of the base rubber.

9. The two-wheeled vehicle tyre according to claim 1, wherein
the loss tangent (tan $\delta c$) of the cap rubber is in a range of from 0.6 to 0.9 times the loss tangent (tan $\delta b$) of the base rubber.

10. The two-wheeled vehicle tyre according to claim 2, wherein
in each of the shoulder regions, a thickness of the cap rubber is in a range of from 10% to 30% of a thickness of the tread rubber.

11. The two-wheeled vehicle tyre according to claim 2, wherein
a land ratio of the tread surface in the crown region is smaller than a land ratio of the tread surface in each of the shoulder regions.

12. A two-wheeled vehicle tyre comprising:
a tread portion comprising a tread rubber,
the tread rubber comprising a cap rubber forming a tread surface and a base rubber disposed radially inwardly of the cap rubber,
300% modulus (M300c) of the cap rubber being greater than 300% modulus (M300b) of the base rubber,
loss tangent (tan $\delta c$) of the cap rubber being smaller than loss tangent (tan $\delta b$) of the base rubber,
the tread surface comprising a crown region centered on a tyre equator and a pair of shoulder regions located axially outwardly of the crown region, and
a thickness of the cap rubber in the crown region being greater than a thickness of the cap rubber in each of the shoulder regions, wherein the cap rubber varies continuously in thickness from the crown region to the respective shoulder regions,
in each of the shoulder regions, a thickness of the cap rubber is in a range of from 10% to 30% of a thickness of the tread rubber,
the crown region has a width ranging from 30% to 40% of a tread width,
in the crown region, a thickness of the cap rubber is in a range of from 80% to 90% of a thickness of the tread rubber,
the cap rubber decreases continuously in thickness from the crown region to each of the pair of tread edges, and
the base rubber increases continuously in thickness from the crown region to each of the pair of tread edges.

13. The two-wheeled vehicle tyre according to claim 2, wherein
in each of the shoulder regions, a thickness of the cap rubber is in a range of from 10% to 20% of a thickness of the tread rubber.

14. The two-wheeled vehicle tyre according to claim 2, wherein
in each of the shoulder regions, a thickness of the cap rubber is in a range of from 10% to 15% of a thickness of the tread rubber.

15. The two-wheeled vehicle tyre according to claim 2, the tread portion further comprising a belt layer having at least one belt ply, and
the base rubber being in contact with the belt layer directly.

* * * * *